(12) United States Patent
Zechlin

(10) Patent No.: US 10,074,258 B2
(45) Date of Patent: Sep. 11, 2018

(54) METHOD AND ARRANGEMENT FOR THE OUTPUT OF WARNING MESSAGES

(71) Applicant: Siemens Schweiz AG, Zurich (CH)

(72) Inventor: Oliver Zechlin, Zug (CH)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

(21) Appl. No.: 15/597,375

(22) Filed: May 17, 2017

(65) Prior Publication Data

US 2017/0337794 A1  Nov. 23, 2017

(30) Foreign Application Priority Data

May 20, 2016  (DE) ........................ 10 2016 208 695

(51) Int. Cl.
*G08B 1/08*   (2006.01)
*G08B 21/02*  (2006.01)
*H04W 76/50*  (2018.01)
*H04W 4/90*   (2018.01)
*G08G 1/005*  (2006.01)

(52) U.S. Cl.
CPC .............. *G08B 21/02* (2013.01); *H04W 4/90* (2018.02); *H04W 76/50* (2018.02); *G08G 1/005* (2013.01)

(58) Field of Classification Search
CPC ..................................................... G08B 21/02
USPC .................................................... 340/539.13
See application file for complete search history.

(56) References Cited

U.S. PATENT DOCUMENTS

| 2008/0001735 | A1* | 1/2008 | Tran | G06F 19/3418 |
| | | | | 340/539.22 |
| 2008/0094230 | A1* | 4/2008 | Mock | G08B 1/08 |
| | | | | 340/573.4 |
| 2009/0022122 | A1* | 1/2009 | Quigley | H04W 40/246 |
| | | | | 370/338 |
| 2009/0163170 | A1 | 6/2009 | Norp et al. | 455/404.1 |
| 2009/0322511 | A1* | 12/2009 | McKenna | G08B 21/10 |
| | | | | 340/539.11 |
| 2010/0210290 | A1 | 8/2010 | Riley et al. | 455/466 |

(Continued)

FOREIGN PATENT DOCUMENTS

| DE | 102009045977 A1 | 4/2011 | ............. G08B 17/00 |
| EP | 2919213 A1 | 9/2015 | ............. G08B 27/00 |
| WO | 2015/048856 A1 | 4/2015 | ............. G08B 21/02 |

OTHER PUBLICATIONS

German Office Action, Application No. 102016208695.2, 9 pages, dated Dec. 9, 2016.

(Continued)

*Primary Examiner* — Santiago Garcia
(74) *Attorney, Agent, or Firm* — Slayden Grubert Beard PLLC

(57) ABSTRACT

The present disclosure relates to messaging. The teachings thereof may be embodied in methods or an arrangement for the output of warning messages to a mobile communication device of a user. For example, a method for transmitting warning messages through a mobile communication device of a user may include: emitting an identification code with a transmitting device situated in the spatial environment of the potential danger; receiving the identification code with a receiving device of the mobile communication device; and transmitting a warning message associated with the identification code to an output device.

14 Claims, 4 Drawing Sheets

(56) References Cited

U.S. PATENT DOCUMENTS

| | | | | |
|---|---|---|---|---|
| 2010/0279647 | A1* | 11/2010 | Jacobs | H04W 4/22 455/404.1 |
| 2012/0290150 | A1 | 11/2012 | Doughty et al. | 701/2 |
| 2013/0183924 | A1* | 7/2013 | Saigh | H04W 4/025 455/404.2 |
| 2013/0278416 | A1* | 10/2013 | Button | G01S 5/0072 340/539.13 |
| 2014/0036683 | A1* | 2/2014 | Krishnamurthy | H04W 40/10 370/236 |
| 2014/0253326 | A1 | 9/2014 | Cho et al. | 340/539.13 |
| 2014/0282934 | A1* | 9/2014 | Miasnik | G06F 17/30861 726/5 |
| 2014/0368601 | A1* | 12/2014 | deCharms | H04W 4/021 348/14.02 |
| 2015/0199896 | A1 | 7/2015 | Estes et al. | 340/541 |
| 2015/0379834 | A1* | 12/2015 | Datta | G08B 15/004 340/384.7 |
| 2016/0044447 | A1 | 2/2016 | Tetreault et al. | 455/41.1 |
| 2016/0165387 | A1* | 6/2016 | Nhu | H04W 4/008 455/41.1 |
| 2016/0379478 | A1* | 12/2016 | Au Yeung | H04M 1/72569 340/870.16 |
| 2017/0122546 | A1* | 5/2017 | Abbott | F21V 33/00 |

OTHER PUBLICATIONS

European Search Report, Application No. 17170577.5, 12 pages, dated Sep. 14, 2017.

* cited by examiner

METHOD AND ARRANGEMENT FOR THE OUTPUT OF WARNING MESSAGES

CROSS-REFERENCE TO RELATED APPLICATIONS

This application claims priority to DE Application No. 10 2016 208 695.2 filed May 20, 2016, the contents of which are hereby incorporated by reference in their entirety.

TECHNICAL FIELD

The present disclosure relates to messaging. The teachings thereof may be embodied in methods or an arrangement for the output of warning messages to a mobile communication device of a user.

BACKGROUND

In buildings, campus facilities and in other public spaces, there exist structurally-related or furniture-related trip hazards or danger points which can lead to accidents and personal injury. These sites are signaled, if at all, with signs and/or warning colors. For example: colored strips on stair treads or indicative texts such as "Caution Step". In public spaces, for example, for people with impaired vision, signal sounds are used at traffic light installations.

Increasingly, the use of smartphones or other communication devices in street traffic can lead to inattentiveness and thereby to accidents. Thus in some cities, there exist pilot projects with pavement traffic lights or LED lights along the curb, which flash at a pedestrian crossing when a set of pedestrian crossing lights switches to red or if a tram is approaching. These pilot projects have previously been only sporadically implemented and they also require complex infrastructure measures for their implementation.

SUMMARY

The teachings of the present disclosure may be embodied in methods for the output of warning messages (WM) to a mobile communication device (MG) of a user (P), the warning messages being warnings of potential dangers in an immediate spatial environment of the mobile communication device (MG), the method comprising the following steps: (VS1) emitting an identification code or a reference to the identification code by a transmitting device (SV) situated in the spatial environment of the potential danger, the identification code being unambiguously associated with the transmitting device (SV); (VS2) receiving the identification code or the reference to the identification code by a receiving device of the mobile communication device (MG); and (VS3) outputting a warning message (WM) associated with the identification code by the mobile communication device (MG) to a suitable output device (AV).

In some embodiments, the warning messages (WM) are warnings of potential dangers in an immediate spatial environment of the mobile communication device (MG), the method comprising the following steps: emitting a warning message (WM) by a transmitting device (SV) situated in the spatial environment of the potential danger; receiving the warning message (WM) by a receiving device of the mobile communication device (MG); and outputting the warning message (WM) by the mobile communication device (MG) to a suitable output device (AV).

In some embodiments, the output of the warning message (WM) taking place on the basis of sensor values that are provided by a sensor system situated in the mobile communication device (MG).

In some embodiments, the output of the warning message (WM) taking place on the basis of the current position of the mobile communication device (MG).

In some embodiments, based upon the current position of the mobile communication device (MG), information regarding the respective immediate spatial environment of the mobile communication device (MG) is called up from a database and therefrom, a hazard context is determined and wherein the output of the warning message (WM) takes place on the basis of the hazard context.

In some embodiments, in the detection of the hazard context, personal data is also taken into account.

In some embodiments, the output of the warning message (WM) takes place on the basis of parameters pre-set by the user.

In some embodiments, the output of the warning message (WM) takes place only on active use of the mobile communication device (MG) by the user (P).

In some embodiments, the warning message (WM) is passed from the communication device (MG) of a user (P) to a communication device (MG1) of a further user (P1).

Some embodiments may include an arrangement for carrying out the methods described above.

Some embodiments include an arrangement for the output of warning messages (WM) to a mobile communication device (MG) of a user (P), the warning messages (WM) being warnings of potential dangers in an immediate spatial environment of the mobile communication device (MG), the arrangement comprising: a transmitting device (SV) configured for emitting a warning message (WM) regarding a potential danger existing in the spatial environment of the transmitting device (SV) and/or configured for emitting an identification code associated with the transmitting device, the transmitting device (SV) being further configured to recognize mobile communication devices (MG) situated in the spatial environment of the transmitting device (SV); a mobile communication device (MG), configured to receive a warning message (WM) and/or the identification code and configured to output the received warning message (WM) and/or configured to output a warning message associated with the identification code; and an output device (AV) for outputting the warning message (WM).

In some embodiments, there is a localization device (POS, SAT) for determining the current position of the mobile communication device (MG), an output of the warning message (WM) only taking place when the mobile communication device (MG) is at a previously determined distance from the transmitting device (SV).

In some embodiments, there is a provision device (S) for providing information regarding a respective spatial environment of a respective transmitting device (SV); and/or for associating a warning message with an identification code, the provision device (S) being configured to communicate via suitable communication mechanisms (KV2) with the mobile communication device (MG).

In some embodiments, there is a determination device (BV) for determining a hazard context based upon the current position of the mobile communication device (MG) and the information regarding the respective spatial environment, the output of the warning message (WM) taking place on the basis of the hazard context.

In some embodiments, the mobile communication device (MG) is configured to pass on the warning message (WM) to a further mobile communication device (MG1).

Some embodiments may include a building automation system or surveillance system for buildings and/or defined regions, comprising an arrangement as described above.

BRIEF DESCRIPTION OF THE DRAWINGS

Various embodiments of the present disclosure will now be described in greater detail by reference to the accompanying drawings. In the drawings.

DETAILED DESCRIPTION

Figure 1:
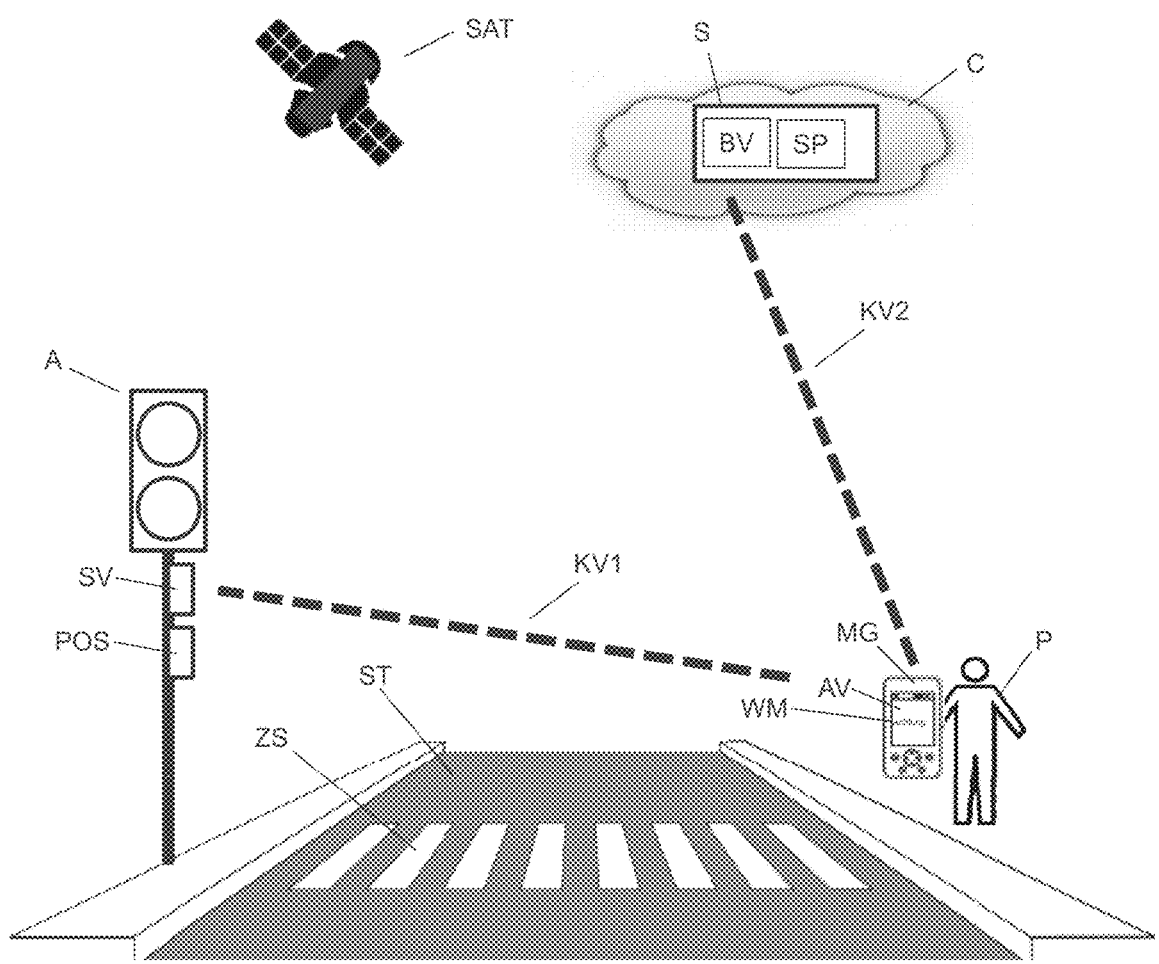
FIG. 1 is a first exemplary arrangement for the issuing of warning messages to a mobile communication device of a user.

The teachings of the present invention may enable economical methods and an economical arrangement for preventing accidents by smartphone users in public spaces.

Some embodiments may include a method for the output of warning messages to a mobile communication device (e.g. smartphone, tablet, laptop) of a user, the warning messages being warnings of potential dangers in an immediate spatial environment of the mobile communication device, the method comprising the following steps:

- emitting an identification code or a reference to the identification code by a transmitting device (e.g. Bluetooth beacon, WLAN) situated in the spatial environment of the potential danger, the identification code being unambiguously associated with the transmitting device;
- receiving the identification code or the reference to the identification code by a receiving device of the mobile communication device; and
- outputting a warning message associated with the identification code (e.g. "Warning—step", "Warning—tram approaching from left") by the mobile communication device to a suitable output device (e.g. display of the mobile communication device, loudspeaker, headset, data eyeglasses). The association of the warning message with the identification code can take place in the communication device (on-device) or in a server connected to the communication device (off-device).

Some embodiments may include a method for the output of warning messages to a mobile communication device of a user, the warning messages being warnings of potential dangers in an immediate spatial environment of the mobile communication device, the method comprising the following steps:

- emitting a warning message by a transmitting device (e.g. iBeacon, WLAN) situated in the spatial environment of the potential danger;
- receiving the warning message by a receiving device of the mobile communication device; and
- outputting the warning message by the mobile communication device to a suitable output device (e.g. display of the mobile communication device, loudspeaker, headset, data eyeglasses). The warning messages can be located in a memory store (e.g. Flash memory) of the transmitting device or in a database to which the transmitting device has access. The warning messages can therefore be provided directly by the transmitting device on the mobile communication device of the user for output.

In some embodiments, the output of the warning message takes place on the basis of sensor values that are provided by a sensor system situated in the mobile communication device (e.g. accelerometer, magnetometer, gyroscope, barometer, proximity sensor). It is thereby ensured that a user is not overwhelmed with unnecessary warning messages. If a user is not actively using his smartphone (e.g. editing messages), he will not receive any warning messages. Software (e.g. an app) situated on the mobile communication device can evaluate the current measurement values of the sensor system and thus permit or suppress the output of a warning message.

In some embodiments, the output of the warning message takes place on the basis of the current position (through active/passive position determination) of the mobile communication device. Thereby also it is ensured that a user is not overwhelmed with unnecessary warning messages. Furthermore, they can be dedicatedly permitted or suppressed depending on the respective current position of the user.

In some embodiments, based upon the current position of the mobile communication device, information regarding the relevant immediate spatial environment of the mobile communication device is called up from a database and therefrom a hazard context is determined, the output of the warning message taking place on the basis of the hazard context. Thus, for example, a hazard context with possibly different warning levels (urgency) can be determined.

In some embodiments, on determining the hazard context, personal data such as, for example, height, weight or disabilities of the user (e.g. impairments relating to hearing, sight, walking or color-blindness) are taken into account. Thus, the warning messages can be output adjusted to greater granularity.

In some embodiments, the outputting of the warning message takes place based upon parameters pre-set by the user (e.g. with app parameters, user profile entry on a server; Facebook settings). Thus, the output of the warning message can be user-related, i.e. based upon a profile defined by the user.

In some embodiments, the output of the warning message takes place only during active use of the communication device by the user. Only in such situations is the user distracted. It is thereby ensured that the user does not receive any unnecessary warning messages. By the sensor systems of the communication device, it is recognized whether the device is currently in use.

In some embodiments, the warning message is passed from the communication device (MG) of a user to a communication device of a further user. This can take place, for example, via a shared social network (e.g. Facebook) or a corresponding messenger service (e.g. Twitter, WhatsApp).

Some embodiments may include an arrangement for carrying out the inventive method. The arrangement can be realized with commercially available apparatus or devices (e.g. commercially available radio transmitters as transmitting devices and commercially available smartphones), with corresponding software. In some embodiments, an arrangement for the output of warning messages to a mobile communication device (e.g. smartphone, tablet computer) of a user, the warning messages being warnings of potential dangers in an immediate spatial environment of the mobile communication device, may comprise:

- a transmitting device (e.g. radio beacon) configured for emitting a warning message regarding a potential danger existing in the spatial environment of the transmitting device and/or configured for emitting an identification code associated with the transmitting device, the transmitting device being further configured to recognize mobile communication devices situated in the spatial environment of the transmitting device;
- a mobile communication device, configured to receive a warning message and/or the identification code and configured to output the received warning message and/or configured to output a warning message associated with the identification code; and
- an output device (e.g. smartphone display, loudspeaker, headset, data eyeglasses) for outputting the warning message. The arrangement can be realized with commercially available means and easily integrated into an existing infrastructure. Statistical warning messages at hazardous sites can thus be replaced or enhanced by dynamic warning messages which are only output on the communication devices of potentially affected users.

In some embodiments, the arrangement comprises a localization device for determining the current position of the mobile communication device, an output of the warning message only taking place when the mobile communication device is at a previously determined distance from the transmitting device. By this means, it is ensured that warning messages are only output to users who are situated with their communication devices in the vicinity or at the location of a possible hazard situation (e.g. a pedestrian crossing). In some embodiments, the distance of the communication device from the transmitting device is determined by a localization system (e.g. GPS). The previously determined distance can be stored as a setting parameter in the transmitting device or in a database entry of a web server that is connected to the communication device, for example, by a suitable internet connection.

In some embodiments, the arrangement comprises a provision device (e.g. database, web server) for providing information regarding a respective spatial environment of a respective transmitting device; and/or for associating a warning message with an identification code, the provision device being configured to communicate via suitable communication mechanisms with the mobile communication device. Thus, further information which is situated on the database or the web server is taken into account in the provision of the warning message.

In some embodiments, the arrangement comprises a determination device for determining a hazard context based upon the current position of the mobile communication device and the information regarding the respective spatial environment, the output of the warning message taking place on the basis of the hazard context. Thus, for example, a coordinated hazard context with possibly different (scaled) warning levels (for example, relating to the urgency) can be determined.

In some embodiments, the inventive arrangement is part of a building automation system or a surveillance system for buildings and/or defined regions. Modern buildings are nowadays often equipped with building automation systems and/or surveillance or safety systems. By the integration or connection of the inventive arrangement in such systems, the safety of the users of a building or campus (e.g. residents, employees) is enhanced.

In some embodiments, the mobile communication device is configured to pass on the warning message to a further mobile communication device. This can take place by a suitable communication connection (e.g. radio, infrared social network platform).

Due to the increasing use of communication devices and the associated concentration given to them by users, for example to a smartphone, the surroundings are perceived only to a restricted extent by the user. The teachings herein may enhance the safety of users of communication devices (e.g. smartphones, wearables, implants, tablet computers) as well as of bodily restricted persons in buildings, campus facilities, or in public spaces (e.g. for pedestrians). Through a display of warning messages and/or warning signals (e.g. warning icons) or other suitable signaling on wearable technologies or devices used by the user, the attention of the user is steered toward an impending trip hazard. Through the use of warning transmitters, ideally with the connection of further sensor systems on the user side, and information, warnings can be issued in a personalized or profiled manner. Thus, for example, "warning spam" can be prevented and personal needs and capabilities of the user can be considered.

The previously static warnings (e.g. color markings; signs) are replaced by dynamic, by digital, and by extended warning notifications adapted to the digital building or the digital campus or a digital public space and help to prevent accidents when the users are distracted by their communication devices.

The methods and the arrangements taught herein for accident prevention are realizable with little investment. If the transmitters/transmitter devices used as infrastructure are dynamically addressable (e.g. commands can be received from outside (Cloud, etc.) to output specific warnings or warning triggers), a use as a locally generic notification solution is also possible: thus in the presence of such an infrastructure, this can be used as an alarm system in the event of a terror attack, etc.

In buildings, campus facilities, and in other public spaces, there exist structurally-related or furniture-related trip hazards and/or danger points which can lead to accidents and personal injury. A radio notifier (e.g. Bluetooth beacon) and/or light emitter (e.g. LED) and/or acoustic emitting device (e.g. loudspeaker) can be placed at or on potential trip hazards, for example, steps or non-self-opening doors. This transmitter or combination of transmitting devices transfers or transfer a freely selectable but defined signal (e.g. identification code or message with a semantic content), for example, by NFC (near field communication) or WLAN to a communication device (e.g. smartphone) of a user present in the vicinity or by the suitable communication mechanisms (e.g. remote data transmission) to a server or cloud. In some embodiments, the signal originates from a database. Also conceivable is a standardized signal. The signal is detected by the communication device on the user side, processed internally and/or externally and, in the appropriate presence of a corresponding application or service, is output by a suitable notification on the communication device or components associated therewith (e.g. headset, data eyeglasses (e.g. Google Glass)). A visual display is cited as a signaling example, such as "Caution Step" (optionally with distance specification and/or further contextual information).

A display of this type may be displayed by an application in use (e.g. Facebook or other social media application).

Notifications can also be integrated directly in the system of the communication device without an additional app or service having to be installed. Furthermore, notifications are optionally activatable or deactivatable by the user and other settings are possible (e.g. if in vicinity of x, warning in the form of y within time of z). Thus, for example, a notification of the user on the basis of pre-defined and stored rules can take place by the case-based reasoning (CBR) with the aid of a corresponding Rule Engine.

In order not to distract or annoy observant users with too many warnings (e.g. at each stair flight per floor when descending the stairway), it is recommended to take account of the sensor system (e.g. accelerometer, magnetometer, gyroscope, barometer, proximity sensor) available at the device.

Example: A smartphone is actively used during continuous forward movement in a building. One or more factors have an effect: the display is on, the CPU load is higher than in normal standby operation, it is held in an angular region x-y or at a distance z from the face of the user (e.g. recognizable by front camera), with a perceptible speed (acceleration sensor; compass; . . . ), touch screen operation is active, a "core location engine" (device for recognizing the usual main position of a user or device) detects position changes, continuous signal strength changes (e.g. WLAN, Bluetooth, 2G/3G/xG) are detected or the camera records the surroundings. If a position change of the communication device is detected by the communication device or by a calculation taking place "in the cloud", it is useful to activate the warning notifications and to present them suitably to the user (e.g. as a warning message on the display of the communication device). In some embodiments, a combination of a plurality of calculation possibilities takes place to improve the accuracy.

The system operates still more accurately if an active or passive positioning, such as localizing the communication device, takes place. In some embodiments, a communication device sporadically or continuously makes updates of its position using one or more technologies suitable therefor, for example, GPS, BT, WLAN, cellular, sensors (e.g. movement sensors or presence sensors), cameras. The localization of the communication device can take place on the communication device itself (e.g. on-device with suitable on-board resources) or with the aid of physical and/or non-physical components linked to the communication device and/or by a suitably equipped server (off-device). The positions detected can be correlated with a database containing information on the surroundings. Thus, a hazard context with possibly different warning levels (urgency) can be determined.

If further contextual data is known concerning the surroundings, for example, from a BIM (building information model) database (e.g. the attributes of stairs, possibly number of steps/height/material; or e.g. door frames with opening height (e.g. lower than normal)), or if external data sources are available (e.g. accident insurance; business type), or personal details of the user (e.g. height x, no disabilities), then warning decisions can be adjusted to greater granularity. Thus it is possible, depending on the respective situation and the physical characteristic values of the respective user, to output adapted or scalable warning messages.

FIG. 1 shows a first exemplary arrangement for the output of warning messages WM to a mobile communication device MG of a user P, the warning messages WM comprising warnings of potential dangers in an immediate spatial environment of the mobile communication device MG, the arrangement comprising a transmitting device SV configured for emitting a warning message WM regarding a potential danger existing in the spatial environment of the transmitting device SV and/or configured for emitting an identification code associated with the transmitting device, the transmitting device being further configured to recognize mobile communication devices MG situated in the spatial environment of the transmitting device SV; a mobile communication device MG configured for receiving a warning message WM and/or the identification code and configured for outputting the received warning message WM, and/or configured for outputting a warning message WM associated with the identification code; and an output device AV for outputting the warning message WM.

The mobile communication device MG can be, for example, a smartphone, a tablet, a laptop or a wearable device (wearable computer, wearable data processing), for example a smartwatch or smartglasses (data eyeglasses). In some embodiments, the transmitting device SV is a transmitting device for emitting radio signals. Bluetooth beacons or WLAN can be used for this. The output device AV can be, for example, a display of the communication device MG, although output can also take place on a headset or data eyeglasses. In some embodiments, an output to a plurality of output devices AV takes place. It is possible, in principle, that the output of a warning message WM takes place on a public screen (e.g. display which is typically for advertisements) in the spatial surroundings.

In some embodiments, the arrangement comprises a localization device POS, SAT for determining the current position of the mobile communication device MG, an output of the warning message WM only taking place when the mobile communication device MG is at a previously determined distance from the transmitting device SV. The localization device can be a satellite-supported position determining system (GPS) SAT or an IPS (indoor positioning system) POS, for example Bluetooth beacons. Indoor positioning systems are widespread nowadays and are easily installable in a building or outside a building, for example, Pseudolite-GPS, WLAN networks or Bluetooth beacons. The position determination within WLAN networks can take place, for example, by trilateration or fingerprinting. The localization can take place by an active or passive position determination.

In some embodiments, the arrangement comprises a provision device S for providing information regarding a respective spatial environment of a respective transmitting device SV; and/or for associating a warning message with an identification code, the provision device S being configured to communicate via suitable communication mechanisms KV2 with the mobile communication device MG. The provision device S is, for example, a web server in a cloud C. The provision device S comprises a memory store SP (e.g. a Flash memory and/or a database). As a communication mechanism KV2 for communication between the provision device S (e.g. web server) and the communication device MG of the user P, for example, a radio connection such as WLAN or satellite communication can be used. As a communication mechanism KV1 for communication between the transmitting device SV (e.g. radio beacon, radio device) and the communication device MG of the user P, for example, WLAN can be used.

The allocation of the warning message WM to the identification code can take place in the communication device MG (on-device) or in the web server S connected to the communication device (off-device). In some embodiments, the web server S comprises a determination device BV for determining a hazard context based upon the current position of the mobile communication device MG and the information regarding the respective spatial environment, the output of the warning message WM taking place on the basis of the hazard context. In some embodiments, the determination device BV is realized with a suitable software program. Advantageously, the determination device BV comprises a rule-based or case-based engine to output, on a rule or case basis, a corresponding warning message WM. The rule-based or case-based engine can also be situated on the communication device MG.

By taking account of the currently present hazard context, a user is not overwhelmed with unnecessary warning messages WM. Without using the device (e.g. smartphone), there is no necessity for the output of a warning message WM. This makes sense only when the communication device MG and/or the web server S determines that a use is currently taking place (e.g. Facebook). (App on, display active, held in the angular range x, possible interaction; possible check by front camera, etc.).

A transmitting device SV (e.g. Bluetooth beacon) can transmit a warning message WM directly to the communication device MG, which then, on the basis of suitable processing logic (position, rules, etc.) is output. The processing logic can take place in the web server S and/or in the communication device MG.

However, a transmitting device SV can also transmit an identification code (e.g. an ID which is unambiguously associated with the transmitting device SV) to the communication device MG. If the identification code is recognized through a database comparison by the web server S (off-device) or by the communication device MG (on-device), the output of a corresponding warning message WM takes place. In some embodiments, the output of the corresponding warning message WM takes place based upon the current position of the communication device MG and/or on the basis of stored profile data of the user.

A transmitting device SV can also send a URL (e.g. Google Eddystone) to the communication device MG, which initiates a correspondingly defined rule in the communication device MG for the output of a corresponding warning message WM.

In some embodiments, the arrangement is integrated into a building automation system or a monitoring system for buildings and/or defined regions. The safety of the user in a building can thereby be enhanced. However, it is also possible that users are warned if they remain in an area for which access is forbidden ("off-limit area") or if they approach such an area.

In the representation of FIG. 1, the arrangement is integrated into the spatial environment of a road ST. A user wishes to cross the road ST at a pedestrian crossing ZS, but is distracted by his smartphone MG. The transmitting device SV is mounted at a pedestrian crossing lights system A, together with a localization system POS, e.g. an indoor positioning system.

Figure 2:
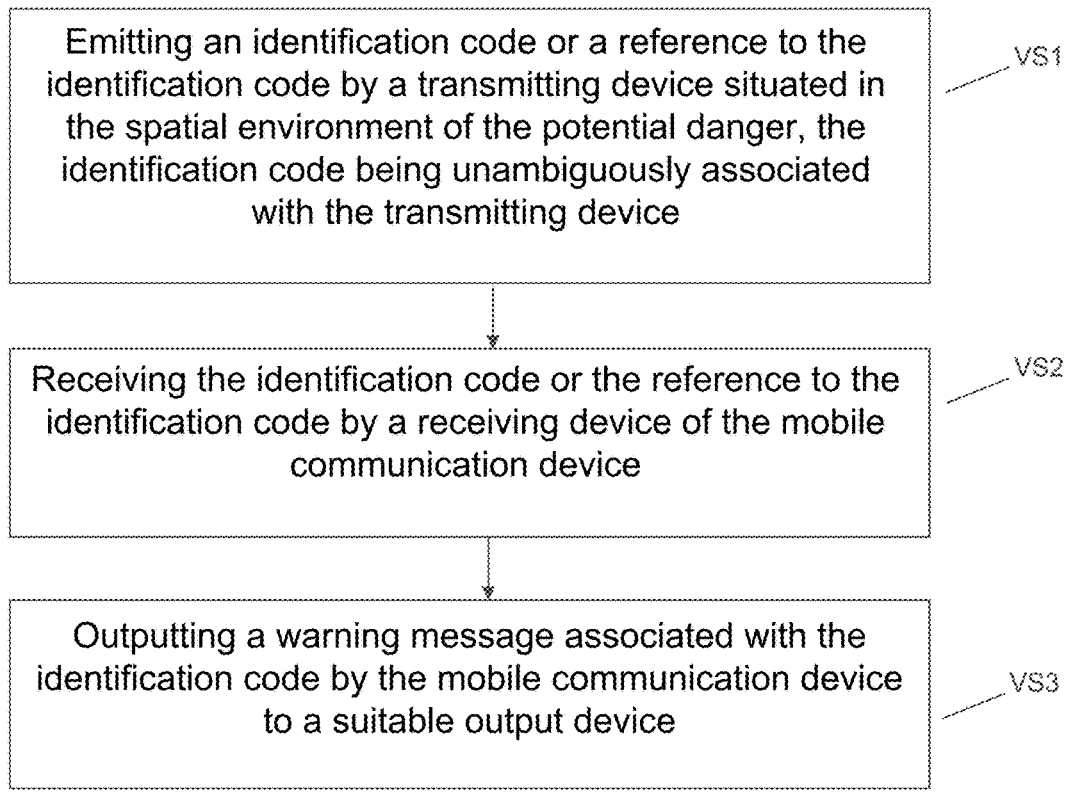
FIG. 2 is a first exemplary flow diagram for a method for the issuing of warning messages to a mobile communication device of a user.

FIG. 2 shows a first exemplary flow diagram for a method for the output of warning messages to a mobile communication device of a user, the warning messages being warnings of potential dangers in an immediate spatial environment of the mobile communication device, the method comprising the following steps:

(VS1) emitting an identification code or a reference to the identification code by a transmitting device situated in the spatial environment of the potential danger, the identification code being unambiguously associated with the transmitting device;

(VS2) receiving the identification code or a reference to the identification code by a receiving device of the mobile communication device; and (VS3) outputting a warning message associated with the identification code by the mobile communication device to a suitable output device.

In the method according to FIG. 2, the output of the warning message takes place based upon the association of an identification code with the warning message. This association can take place through a database comparison in the communication device (e.g. smartphone), "on-device". This association can, however, also take place through a database comparison in a web server (e.g. situated in a cloud infrastructure) connected to the communication device through a suitable communication medium (e.g. satellite radio, internet).

Figure 3:
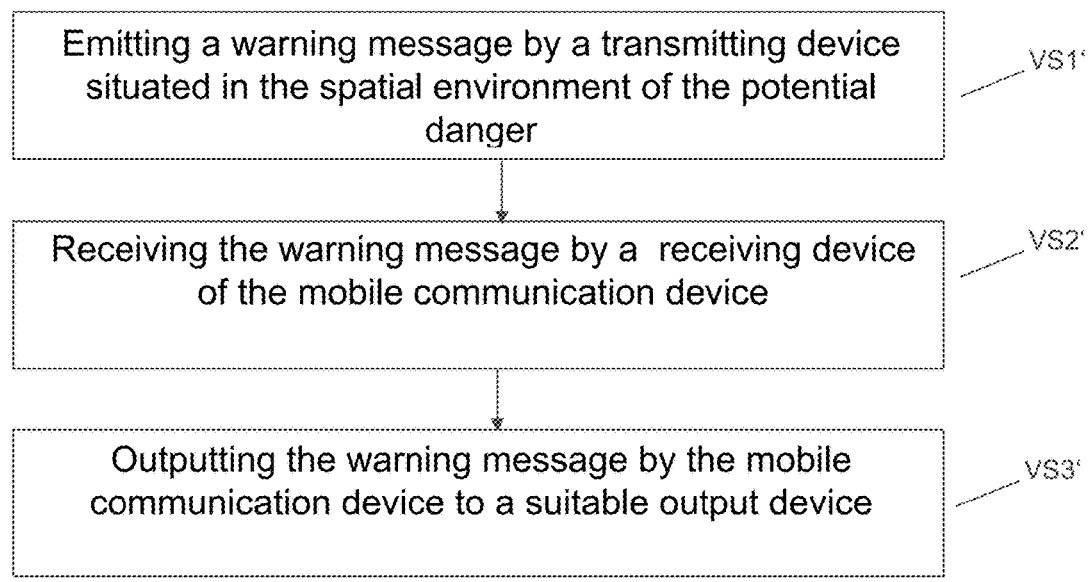
FIG. 3 is a second exemplary flow diagram for a method for the issuing of warning messages to a mobile communication device of a user.

FIG. 3 shows a second exemplary flow diagram for a method for the output of warning messages to a mobile communication device of a user, the warning messages being warnings of potential dangers in an immediate spatial environment of the mobile communication device, the method comprising the following steps:

(VS1') emitting a warning message by a transmitting device situated in the spatial environment of the potential danger;

(VS2') receiving the warning message by a receiving device of the mobile communication device; and (VS3') outputting the warning message by the mobile communication device to a suitable output device. In this alternative method, a warning message is sent by the transmitting device directly to the communication device of the user. By suitable processing logic (position, user profile, rules), the output of the warning message takes place. The processing logic can take place by the communication device and/or a web server connected to the communication device via a suitable communication medium (e.g. satellite radio, internet). Advantageously, the web server is situated in a cloud infrastructure.

The methods of FIGS. 2 and 3 can be realized with commercially available components (e.g. smartphone, radio transmitter, positioning system, software programs, etc.).

Figure 4:
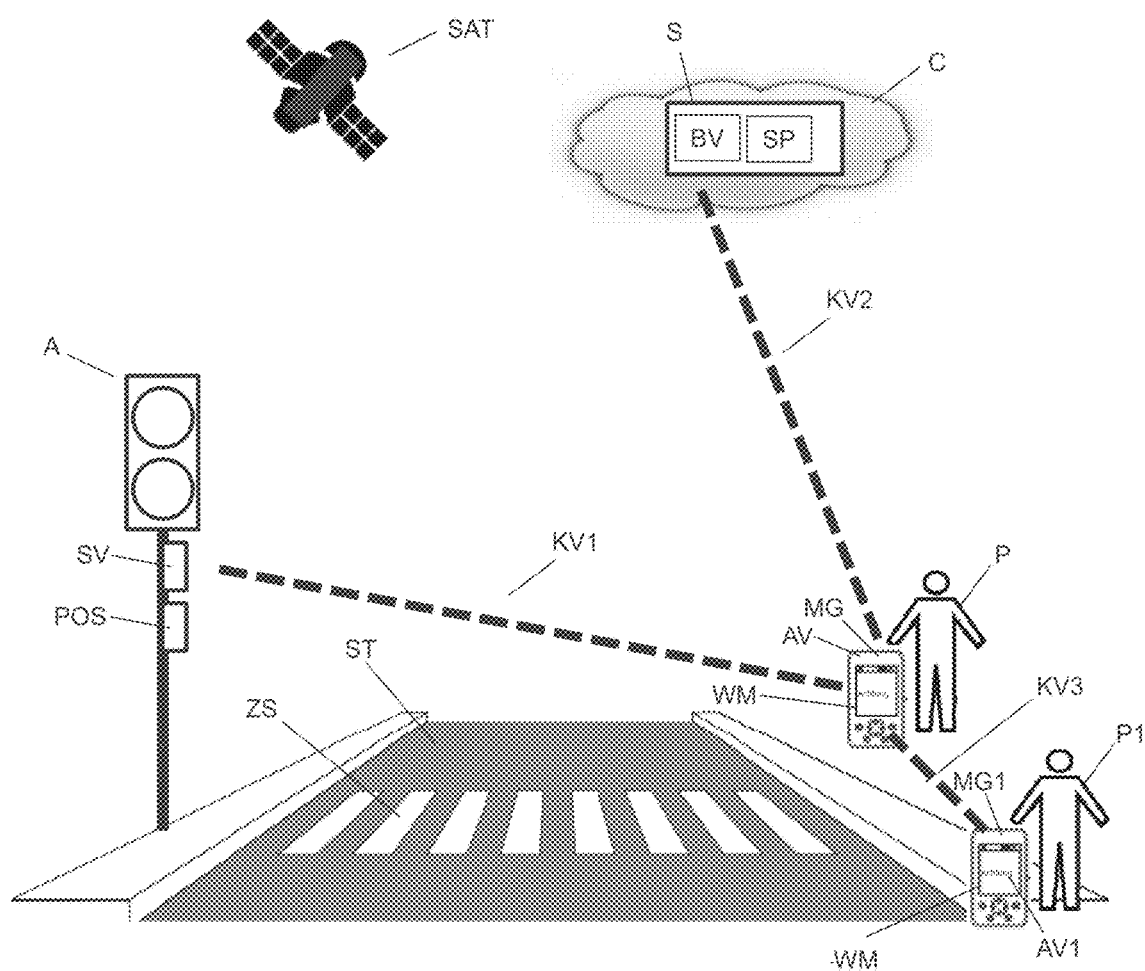
FIG. 4 is a second exemplary arrangement for the issuing of warning messages to a mobile communication device of a user.

FIG. 4 shows a second exemplary arrangement for the issuing of warning messages to a mobile communication device of a user. The representation of FIG. 4 extends the representation and the arrangement of FIG. 1 by the feature that a warning message WM from the mobile communication device MG of the user P is passed on to the mobile communication device MG1 of a further user P1 via a suitable communication connection KV3, e.g. via a social network (e.g. Facebook) or via a messenger (e.g. WhatsApp, Twitter). This is useful, inter alia, in situations in which a person is not himself in a position to receive a warning message as a primary message.

Example Scenario:

If an endangered person (approaching a known danger site; the site can actively transmit a determining ID, or is recorded in a database system) is not able to receive a warning message or a determining ID, e.g. because the communication device used does not have the necessary software or hardware or it is deactivated, a warning to the endangered person can be triggered by a communication devices (e.g. smartphones) of third persons situated in the vicinity.

The communication devices of third parties situated in the vicinity having a correspondingly active hardware/software/service, receive the determining IDs in the vicinity and/or compare their position with danger points stored in a database. Thus, the users of these communication devices can be warned of these danger sites—not, however, the users without the corresponding hardware/software/service necessary for this (e.g. because Bluetooth is deactivated). Here the invention comes into effect:

If the endangered person is, for example, logged into social networks (e.g. via Facebook) as are other persons in the vicinity, such a network can be used to transmit the danger warning in time to the endangered person (e.g. via Facebook Messenger). Ideally, this takes place automatically. The position of the individual persons or devices is typically communicated regularly to various service providers, so that the probability that the endangered person and also third parties nearby are represented in one or more of such services is high.

If the communication device used by the endangered person continues to be or is instead registered with the same manufacturer services or OS services as the devices of the third parties situated in the vicinity, such a route can also be used for the output of a warning.

The more third parties there are in the vicinity of the endangered person, the finer the granularity with which the position determination and thus the probability of an endangerment can occur. This can take place with the aid of a radio network (e.g. GSM via a network operator or locally via a WLAN). Given the existence of at least two appropriate (e.g. found in the same network) third persons, the position of the endangered person can be determined more accurately. Herein, for example, a triangulation method can be used.

As a basis for communicating a warning message, one or more communication device usage features apply, e.g. the holding of a smartphone in the typical angular range for use during walking movement; display on; messenger use active; use of keypad, etc.

Depending on the evaluation of the risk of a potential danger site, a warning is output for a risk assessed as high, even for a relatively unclear usage situation. This applies particularly also for temporally recent events in the relatively close environment (e.g. a poison gas cloud) for which no assessment and storage in a danger database has taken place.

Due to the increasing use of communication devices and the associated concentration devoted to them by users, for example, to a smartphone, the surroundings are perceived only to a restricted extent.

These arrangements and methods may be employed to increase the safety of users of communication devices/wearables/implants, as well as of bodily restricted persons in buildings, campus facilities or in public spaces. A display or other signaling on/by the wearable technologies used by the user guides the attention to the approaching "trip hazard". Through the use of warning transmitters, ideally with the connection of further sensor systems present on the user side, and information, warnings can be issued in a personalized or profiled manner. Thus, for example, "warning spam" can be prevented and personal needs and capabilities of the user can be considered. The conventionally static warnings (e.g. color marking; sign) are replaced by dynamic, by digital, and by extended, warning notifications adapted to the digital building/campus/public space and these help to prevent accidents. An optimization for accident prevention described in the method is possible with little investment.

If the transmitters/transmitting devices used as infrastructure are dynamically addressable (commands can be received from externally (Cloud, etc.) to output specific warnings or warning triggers), a further use as a local generic notification solution is possible: thus, given the existence of such an infrastructure, it can be used as an alarm system in the event of a terrorist attack, etc.

REFERENCE CHARACTERS

SAT Satellite
SV Transmitting device
POS Position determining system
C Cloud
S Server
BV Determination device
SP Memory store
P, P1 Person
MG, MG1 Communication device
WM Warning message
AV, AV1 Output device
ST Road
ZS Pedestrian crossing
KV1-KV3 Communication connection
VS1-VS3 Method step
VS1'-VS3' Method step

The invention claimed is:

1. A method for transmitting warning messages through a mobile communication device of a user, the warning messages including warnings of potential dangers in an immediate spatial environment of the mobile communication device, the method comprising:
   emitting an identification code or a reference to the identification code by a transmitting device situated in the spatial environment of the potential danger, the identification code unambiguously associated with the transmitting device;
   receiving the identification code or the reference to the identification code by a receiving device of the mobile communication device; and
   transmitting a warning message associated with the identification code by the mobile communication device to an output device;
   wherein displaying the warning message by the output device takes place only if an active use of the mobile communication device by the user is detected.

2. A method for transmitting warning messages to a mobile communication device of a user, the warning messages including warnings of potential dangers in an immediate spatial environment of the mobile communication device, the method comprising:
   emitting a warning message by a transmitting device situated in the spatial environment of the potential danger;
   receiving the warning message by a receiving device of the mobile communication device; and
   transmitting the warning message by the mobile communication device to a suitable output device;
   wherein transmitting the warning message takes place only if an active use of the mobile communication device by the user is detected.

3. The method as claimed in claim 1, wherein transmitting the warning message depends at least in part on sensor values generated by a sensor system associated with the mobile communication device.

4. The method as claimed in claim 1, wherein transmitting the warning message depends at least in part on a current position of the mobile communication device.

5. The method as claimed in claim 1, further comprising:
determining a current position of the mobile communication device,
gathering information regarding an immediate spatial environment of the mobile communication device from a database, and
determining a hazard context based on the gathered information,
wherein transmitting the warning message depends at least in part on the hazard context.

6. The method as claimed in claim 5, further comprising assessing personal data and adapting the hazard context based on the personal data.

7. The method as claimed in claim 1, wherein transmitting the warning message depends at least in part on parameters pre-set by the user.

8. The method as claimed in claim 1, further comprising passing the warning message from the communication device of the user to a communication device of a further user.

9. An arrangement for transmitting warning messages to a mobile communication device of a user, the warning messages including warnings of potential dangers in an immediate spatial environment of the mobile communication device, the arrangement comprising:
a transmitting device for emitting a warning message regarding a potential danger existing in the spatial environment of the transmitting device or an identification code associated with the transmitting device,
the transmitting device recognizing mobile communication devices situated in the spatial environment of the transmitting device;
a mobile communication device to receive the warning message or the identification code and to transmit the received warning message or to output a warning message associated with the received identification code; and
an output device for outputting the warning message;
wherein displaying the warning message by the output device takes place only if an active use of the mobile communication device by the user is detected.

10. The arrangement as claimed in claim 9, further comprising a localization device determining the current position of the mobile communication device, and
wherein transmission of the warning message only takes place when the mobile communication device is within a previously determined distance from the transmitting device.

11. The arrangement as claimed in claim 9, further comprising a provision device providing information regarding a respective spatial environment of a respective transmitting device or for associating a warning message with an identification code,
wherein the provision device communicates via communication mechanisms with the mobile communication device.

12. The arrangement as claimed in claim 9, further comprising a determination device determining a hazard context based upon a current position of the mobile communication device and information regarding the respective spatial environment,
wherein transmission of the warning message depends at least in part on the hazard context.

13. The arrangement as claimed in claim 9, wherein the mobile communication device passes on the warning message to a further mobile communication device.

14. A building automation system or surveillance system for buildings or defined regions, the system comprising:
a transmitting device for emitting a warning message regarding a potential danger existing in the spatial environment of the transmitting device or an identification code associated with the transmitting device,
the transmitting device recognizing mobile communication devices situated in the spatial environment of the transmitting device;
a mobile communication device to receive the warning message or the identification code and to transmit the received warning message or to output a warning message associated with the received identification code; and
an output device for outputting the warning message;
wherein displaying the warning message with the output device takes place only if an active use of the mobile communication device by the user is detected.

* * * * *